(12) United States Patent
Zhang et al.

(10) Patent No.: US 9,686,139 B2
(45) Date of Patent: Jun. 20, 2017

(54) METHOD AND NETWORKING DEVICE FOR SETTING NETWORK CONNECTION PARAMETERS

(71) Applicant: Xiaomi Inc., Beijing (CN)

(72) Inventors: Pengfei Zhang, Beijing (CN); Heng Qu, Beijing (CN); Yidong Wang, Beijing (CN); Yongfeng Xia, Beijing (CN)

(73) Assignee: XIAOMI INC., Haidian District, Beijing (CN)

( * ) Notice: Subject to any disclaimer, the term of this patent is extended or adjusted under 35 U.S.C. 154(b) by 85 days.

(21) Appl. No.: 14/330,001

(22) Filed: Jul. 14, 2014

(65) Prior Publication Data

US 2015/0117255 A1    Apr. 30, 2015

Related U.S. Application Data

(63) Continuation of application No. PCT/CN2014/077002, filed on May 8, 2014.

(30) Foreign Application Priority Data

Oct. 25, 2013    (CN) .......................... 2013 1 0511978

(51) Int. Cl.
*H04L 12/24* (2006.01)
*H04L 29/06* (2006.01)
*H04L 12/413* (2006.01)

(52) U.S. Cl.
CPC ........ *H04L 41/0886* (2013.01); *H04L 12/413* (2013.01); *H04L 69/18* (2013.01); *H04L 69/24* (2013.01)

(58) Field of Classification Search
None
See application file for complete search history.

(56) References Cited

U.S. PATENT DOCUMENTS

| 6,212,160 | B1 | 4/2001 | Barbieri |
| 7,392,301 | B1 | 6/2008 | Perry, Jr. et al. |
| 7,551,563 | B2* | 6/2009 | Beadle .................... H04L 45/00 370/238 |
| 7,680,127 | B2* | 3/2010 | Yang ................... H04L 12/2697 370/231 |
| 2004/0001496 | A1 | 1/2004 | Yusko |

(Continued)

FOREIGN PATENT DOCUMENTS

| CN | 1509058 A | 6/2004 |
| CN | 101083565 A | 12/2007 |

(Continued)

OTHER PUBLICATIONS

"European Search Report for 14190373.2-1853".
"International Search Report for PCT/CN2014/077002".

*Primary Examiner* — Anh Ngoc Nguyen
(74) *Attorney, Agent, or Firm* — Jun He Law Offices P.C.; James J. Zhu

(57) ABSTRACT

The present disclosure discloses a method for automatically setting network connection parameters in a networking device, comprising: accessing a network; acquiring all network connection manners supported by the network; selecting a network connection manner to be used from the acquired network connection manners; and automatically setting network connection parameters for the selected network connection manner. Accordingly, the efficiency of setting network connection parameters may be improved.

18 Claims, 2 Drawing Sheets

(56) References Cited

U.S. PATENT DOCUMENTS

| | | | | |
|---|---|---|---|---|
| 2004/0105444 | A1* | 6/2004 | Korotin | H04L 12/2856 370/395.5 |
| 2008/0162702 | A1* | 7/2008 | Jia | H04L 12/2856 709/227 |
| 2008/0225855 | A1* | 9/2008 | Lu | H04L 29/12207 370/395.2 |
| 2010/0100646 | A1* | 4/2010 | Park | H04L 12/413 710/8 |

FOREIGN PATENT DOCUMENTS

| | | |
|---|---|---|
| CN | 101321099 A | 12/2008 |
| CN | 101796485 A | 8/2010 |
| CN | 101998695 A | 3/2011 |
| CN | 102223270 A | 10/2011 |
| CN | 102625332 A | 8/2012 |
| CN | 102801627 A | 11/2012 |
| CN | 102984293 A | 3/2013 |
| CN | 103607290 A | 2/2014 |
| JP | 2003283589 A | 10/2003 |
| JP | 2005025753 A | 1/2005 |
| JP | 2006014169 A | 1/2006 |
| JP | 2008042834 A | 2/2008 |
| JP | 2009135621 A | 6/2009 |
| JP | 2015510744 A | 4/2015 |
| RU | 2276461 C2 | 5/2006 |
| WO | 0241578 A2 | 5/2002 |
| WO | 2009/001444 A1 | 12/2008 |

* cited by examiner

METHOD AND NETWORKING DEVICE FOR SETTING NETWORK CONNECTION PARAMETERS

CROSS-REFERENCE TO RELATED APPLICATIONS

This application is a Continuation of International Application No. PCT/CN2014/077002, filed on May 8, 2014, which is based upon and claims priority to Chinese Patent Application 201310511978.X, filed Oct. 25, 2013, the entire contents of which are incorporated herein by reference.

TECHNOLOGY FIELD

The present disclosure relates to networking devices, and more particularly, to a method for setting network connection parameters in a networking device and the networking device thereof.

BACKGROUND

With rapid development of Internet, a router as an important networking device in Internet has been rapidly developed and widely used. A router is the hub of Internet data transmission, and may choose the best channel for data transmission according to channel conditions.

Traditionally, a router may provide a settings page for setting various parameters thereof. When a user wants to use a terminal (such as a computer) to access Internet via the router, the user may log in the settings page of the router via the terminal and set initial network connection parameters (or be called as external network connection parameters) in the settings page, and then the terminal may be connected to the Internet through the router for data transmission. For example, if a user accesses Internet in a PPPOE (Point-to-Point Protocol Over Ethernet) mode (a kind of network connection mode in which the user's access to Internet is controlled and accounted by an access server), the user may log in the settings page of the router via the terminal, open the corresponding settings options by click, and fill in account and password registered at an appropriate network provider (such as Great Wall Broadband).

During the implementation of the above processes, the inventors have found at least the following technical problems:

When setting network connection parameters, the user needs to click on multi-level options in order to finally open an option to be set and set the corresponding parameters in the option, which leads to low efficiency of setting the network connection parameters.

SUMMARY

The embodiments of the present disclosure provide a method for setting network connection parameters in a networking device and the networking device thereof.

According to a first aspect of the embodiments of the present disclosure, there is provided a method for automatically setting network connection parameters in a networking device, comprising: accessing a network; acquiring all network connection manners supported by the network; selecting a network connection manner to be used from the acquired network connection manners; and automatically setting network connection parameters for the selected network connection manner.

According to a second aspect of the embodiments of the present disclosure, there is provided a networking device, comprising: a memory; and one or more processors; wherein one or more programs are stored in the memory and the one or more programs are configured to be executed by the one or more processors and comprise the following operable instructions of: accessing a network; acquiring all network connection manners supported by the network; selecting a network connection manner to be used from the acquired network connection manners; and automatically setting network connection parameters for the selected network connection manner.

According to a third aspect of the embodiments of the present disclosure, there is provided a non-transitory computer-readable storage medium having stored therein instructions that, when executed by a processor of a networking device, causes the networking device to perform a method for automatically setting network connection parameters in a networking device, comprising: accessing a network; acquiring all network connection manners supported by the network; selecting a network connection manner to be used from the acquired network connection manners; and automatically setting network connection parameters for the selected network connection manner.

The technical solutions in the embodiments of the present disclosure may have the following advantages.

According to the present disclosure, all network connection manners supported by the current access network are acquired, a network connection manner to be used is selected according to the network connection manners supported by the current access network, and network connection parameters are automatically set for the selected network connection manner to be used, so that the network connection parameters may be automatically set according to the network connection manners supported by the current access network without clicking on multi-level options in a settings page, thereby improving efficiency of setting network connection parameters.

It should be understood that the above general description and the detailed description below are merely exemplary, and do not limit the present disclosure.

BRIEF DESCRIPTION OF THE DRAWINGS

The appending drawings which constitutes a part of the present description provide the further understanding to the present disclosure, and don't limit the present disclosure, in which.

Embodiments of the present disclosure that have been illustrated through the above drawings will be described in detail hereinafter. These drawings and description do not intend to limit the spirit by the present disclosure, but to explain the principle of the present disclosure to those skilled in the art with reference to particular embodiments.

DETAILED DESCRIPTION

In order to clarify the objects, technical solutions and advantages of the present disclosure, the present disclosure will be described in detail with reference to the embodiments and the appending drawings hereafter. Herein, the example embodiment of the present disclosure and illustration thereof intend to explain the present disclosure, rather than limit the present disclosure.

The networking device is used for connecting a variety of terminal devices, such as personal computers, portable pads and mobile phones into a wide area network. The embodiments of the present disclosure provides a method for setting network connection parameters in a networking device and the networking device thereof, and the present disclosure will be described in detail with reference to the appending drawings.

Figure 1:
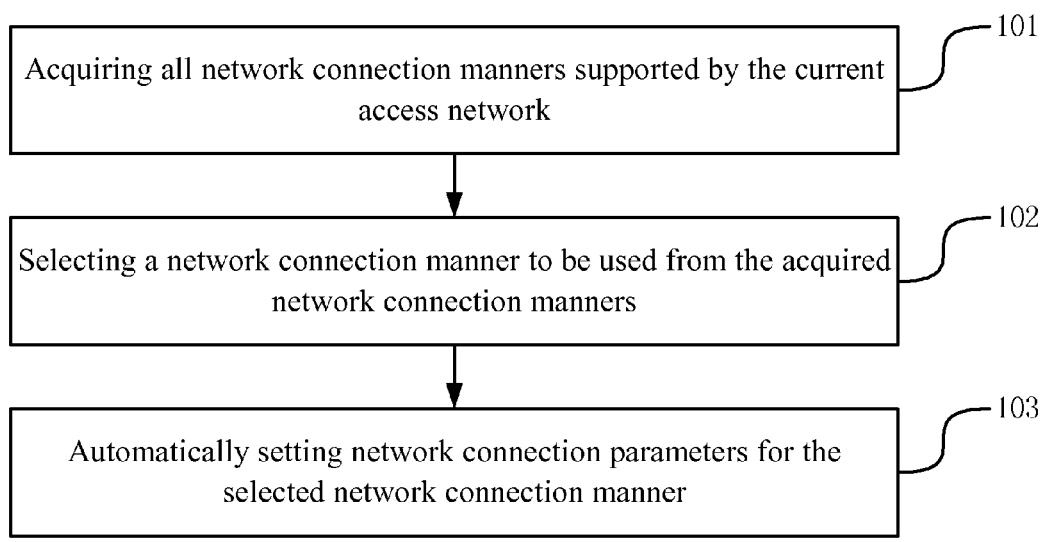
FIG. 1 is a flowchart showing a method for setting network connection parameters according to an exemplary embodiment of the present disclosure.

The embodiment of the present disclosure provides a method for setting network connection parameters in a networking device when the networking device accesses a network. The network that the networking device is accessing is indicated as "a current access network" in the following description. As shown in FIG. 1, the method may include the following steps.

In a step 101, all network connection manners supported by the current access network are acquired.

In a step 102, a network connection manner to be used is selected from the acquired network connection manners.

In a step 103, network connection parameters are automatically set for the selected the network connection manner.

In this embodiment of the present disclosure, the network connection manners supported by the current access network are acquired, a network connection manner to be used is selected according to the network connection manners supported by the current access network, and network connection parameters are automatically set for the selected network connection manner. In this way, the network connection parameters may be automatically set according to the network connection manners supported by the current access network without clicking on multi-level options in a settings page, thereby improving efficiency of setting network connection parameters.

The embodiment of the present disclosure provides a method for setting network connection parameters, which can be performed by any networking device such as a router and the like. For purpose of clarity, in the following description the method will be described in detail by taking the router as an example of the networking device. However, the present disclosure does not limit the networking device as the router. The networking device in the present disclosure does not only include a separate networking device, such as a modem or a router, but also include any electronic device, which or part of which can perform the steps of the method shown in FIG. 1. For example, a portable electronic device (such as a mobile phone) which is enable to perform the method disclosed herein, falls into the category of the networking device of the present disclosure. Those of skill in the art will recognize that the techniques described herein also support other networking device and thus the description thereof will be omitted.

Hereafter, through a more detailed exemplary embodiment, the process shown in FIG. 1 will be explained in detail as follows.

In the step 101, the network connection manners supported by the current access network are acquired in the networking device, such as the router.

Herein, the current access network may be a network to which a WAN (Wide Area Network) interface of this networking device (the router) is connected. The network connection manner is a manner in which a terminal device or a router accesses the Internet, and may include a DHCP (Dynamic Host Configuration Protocol) network connection manner, a PPPOE network connection manner, and so on. For the DHCP network connection manner, an IP address is allocated for a terminal device by a DHCP server in the network such that the terminal device accesses the Internet using the IP address. For the PPPOE network connection manner, an identity of a terminal device is verified by a PPPOE access server and then an IP address is allocated for the terminal device after verification, such that the terminal device accesses the Internet using the IP address. The network connection manners supported by network include manners that may be used by a terminal device or a router in the network to accesses Internet.

For example, a user may enter an internal network IP address of a router (e.g. 192.168.1.1) into a browser address bar of a terminal device (such as a computer), and as a result, the terminal device transmits a request for a settings page (which is used to request for displaying the settings page of the router) to the router. The router verifies the identity of the terminal device (e.g. to verify account and password of the router) after receiving the request for displaying the settings page, and transmits data on the settings page to the terminal device after verification. Alternatively, when the data on the settings page is transmitted to the terminal device requesting for displaying the setting page, the network connection manners supported by the current access network may be acquired.

Alternatively, the network connection manners supported by the network may be determined by judging whether or not there are servers corresponding to the network connection manners in the current access network. Several alternative manners of the step 101 are provided as follows.

First Manner for Acquiring Supported Network Connection Manners

In order to acquire all network connection manners supported by the network, at first, discovery messages corresponding to at least one preset network connection manner are broadcast in the current access network.

Herein, the preset network connection manner may include any network connection manner preset in the current access network, such as PPPOE network connection manner, DHCP network connection manner, and so on. The discovery message corresponding to a network connection manner may be a discovery message of a corresponding network protocol (such as PPPOE or DHCP). For example, when the network connection manner is a DHCP network connection manner, the DHCP discovery message will be broadcasted. The discovery message is a message which is used to initiate a handshake process under the corresponding network protocol so as to establish a network connection.

For example, one or more network connection manners may be set in advance and thus the discovery messages corresponding to respective preset network connection manners are broadcast by a WAN interface when the first step is carried out.

Alternatively, the preset network connection manner may include a PPPOE network connection manner and a DHCP network connection manner, and thus the discovery messages corresponding to the PPPOE network connection manner and the DHCP network connection manner may be respectively broadcast in the current access network in the first step. That is, a PPPOE discovery message and a DHCP discovery message are respectively broadcast in the current access network.

Then, if the networking device receives a response message for the broadcast discovery message, the network connection manner corresponding to a received response message is determined as a network connection manner supported by the current access network.

For example, after the router broadcasts the discovery message, a corresponding server receives the discovery message and then returns a response message of a corresponding network protocol to the router. For example, a DHCP server receives a DHCP discovery message broadcast by the router and then returns a DHCP response message to the router, and a PPPOE server receives a PPPOE discovery message broadcast by the router and then returns a PPPOE response message to the router. After receiving the response messages, the router determines the network connection manners corresponding to respective response messages, i.e. the network connection manners of the network protocols on which the response messages are based. Respective determined network connection manners are used as the network connection manners supported by the current access network. If any response message is not received in a preset period, it is considered that there is not supported network connection manner in the current access network. For example, in case that the router broadcasts a DHCP discovery message and a PPPOE discovery message, the router determines the DHCP network connection manner is not supported by the current access network if it does not receive a DHCP response message after a preset period. While the router determines the PPPOE network connection manner is supported by the current access network if it receives a PPPOE response message.

It should be noted that after receiving a response message of a certain network protocol, the router may not perform a subsequent handshake process and may not reply to the response message.

Second Manner for Acquiring Supported Network Connection Manners

Alternatively, the present disclosure further provides another manner for acquiring supported network connection manners. According to the second manner, at first, a discovery message corresponding to a first network connection manner is broadcast in the current access network.

Then, if a response message corresponding to the first network connection manner is received, the first network connection manner is determined as the network connection manner supported by the current access network.

Next, if the response message corresponding to the first network connection manner is not received, a discovery message corresponding to a second network connection manner is broadcast in the current access network, and when a response message corresponding to the second network connection manner is received, the second network connection manner is determined as the network connection manner supported by the current access network.

Herein, the first network connection manner is configured with high priority, and the second network connection manner is configured with low priority. The first network connection manner and the second network connection manner may include any network connection manner and may be set as desired. For example, the first network connection manner may include a PPPOE network connection manner, and the second network connection manner may include a DHCP network connection manner. Because the PPPOE network connection manner is assigned as the first network connection manner, the PPPOE network connection manner has high priority in this example.

According to the above second manner, only one network connection manner supported by the current access network can be acquired. Therefore, if the response message corresponding to the first network connection manner is received, the first network connection manner is acquired as a single network connection manner supported by the current access network. If the first network connection manner is not supported, the networking device will further confirm whether the second network connection manner is supported. If the second network connection manner is found to be supported by the current access network, it will be acquired as a single network connection manner supported by the current access network, otherwise the networking device continue to broadcast discovery messages to find a network connection manner supported by the current access network.

After acquiring supported network connection manners, the method proceeds to step 102. In the step 102, the network connection manner to be used is selected from the acquired network connection manners by the networking device, such as the router.

For example, the network connection manner to be used may be automatically selected from the network connection manners supported by the current access network according to some preset selection criterion. For example, a priority level is preset for various network connection manners, and the networking device automatically sets the network connection manner with a highest priority among the supported network connection manners as a network connection manner to be used. In addition, the network connection manner to be used may be selected by a user, and the process thereof is exemplarily described as follows.

At first, after all the supported network connection manners are acquired by the networking device, the networking device responds to the terminal device requesting for displaying the settings page with a network selection request to inform the terminal device the network connection manners supported by the current access network. Upon the terminal device receives the network selection request, options of network connection manners indicated in the network selection request are displayed in the display screen of the terminal device so that the user can select the network connection manner to be used.

Herein, the network selection request is used to request a user to select a network connection manner to be used.

For example, as described in the step 101, after the terminal device requests the router to display the settings page, the router transmits data on a setting page to the terminal device after identity verification, and simultaneously performs the steps of acquiring all network connection manner supported by the current access network. After acquiring all network connection manner supported by the current access network, the router may transmit a network selection request to the terminal device which displays the settings page of the router, and makes the network selection request carry the information of the acquired respective network manners which are supported by the current access network. After receiving the network selection request, the terminal device displays a selection window in which the options of respective network connection manners carried in the network selection request are displayed so that the user can select the network connection manner to be used.

For example, if the network connection manners supported by the current access network include a PPPOE network connection manner and a DHCP network connection manner, the router may record the PPPOE network connection manner and the DHCP network connection manner in the network selection request, and after receiving the network selection request, the terminal device displays the options of the PPPOE network connection manner and the DHCP network connection manner in the selection window so that the user can select the DHCP or PPPOE network connection manner as the network connection manner to be used.

Then, a response message carrying the selected network connection manner transmitted by the terminal device is received.

Herein, the response message is a message in reply to the network selection request.

For example, a user may select a network connection manner (that is, a selected network connection manner) from the network connection manners displayed in the above selection window, and the terminal device generates a response message in which the selected network connection manner is carried and transmits the response message to the router.

Next, the selected network connection manner carried in the response message is determined as the network connection manner to be used.

For example, the router may analyze the response message and acquire the carried network connection manner selected by the user, and the selected network connection manner is determined as the network connection manner to be used.

In addition to the above steps, alternatively, if there is only one acquired network connection manner supported by the current access network, the acquired single network connection manner is directly determined as the network connection manner to be used.

For example, if the router receives only a DHCP response message after broadcasting discovery messages of one or more types of protocols, the DHCP network connection manner is determined as the network connection manner to be used.

Alternatively, if there is no network connection manner supported by the current access network, a default network connection manner is determined as the network connection manner to be used.

Herein, the default network connection manner may be set as one of any network connection manner. For example, the default network connection manner may be set as a DHCP network connection manner.

For example, if the router does not receive any response message after broadcasting discovery messages of one or more types of protocols, the default DHCP network connection manner may be determined as the network connection manner to be used.

In the step 103, the network connection parameters may be automatically set for the selected network connection manner by the networking device, such as the router.

Herein, the network connection parameters may be control parameters which is used in communication between the networking device and a connected network, and may be referred as external connection parameters or WAN interface parameters.

Different setting may be applied to different network connection manners to be used, when automatically setting network connection parameters in the step 103.

Parameters for PPPOE Network Connection Manner

For example, if the network connection manner to be used is a PPPOE network connection manner, account and password for PPPOE login are acquired in the step of automatically setting network connection parameters.

Figure 2:
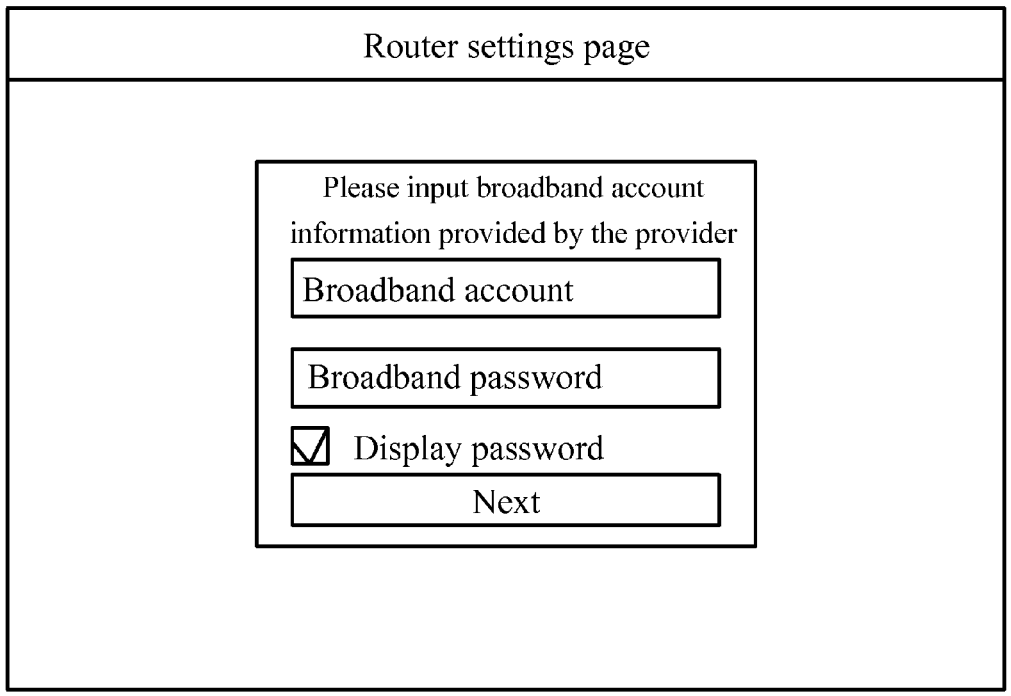
FIG. 2 is a block diagram showing a settings page in a terminal device according to an exemplary embodiment of the present disclosure.

For example, the router may transmitted a PPPOE verification request to the terminal device which requests for displaying a settings page, and the terminal device displays a window for inputting PPPOE verification information after receiving the PPPOE verification request. As shown in FIG. 2, the user may input the account and the password (i.e. broadband account and password) for PPPOE login into the window, the account and the password may be registered at a network provider in advance, for example, the account and the password of ChangCheng broadband registered by a user may be used to login a PPPOE access server of the ChangCheng broadband. A response message, in which the account and the password input by the user is carried, may be generated when the user clicks on a confirmation button after inputting the account and the password into an inputting window of PPPOE verification information, and may be transmitted to the router.

In a second step, the parameter value of connection manner parameter option among the network connection parameters may be set as PPPOE, and the parameter values corresponding to parameter options of PPPOE account and PPPOE password are respectively set as the acquired account and password.

For example, a settings interface of network connection parameters may be included in a settings page of the router, and the connection manner parameter options, which may include a plurality of optional parameter values such as PPPOE, DHCP and so on, may be included in the settings page. Different parameter options correspond to different network connection manners. Upon initiating the router, a network connection of a corresponding network connection manner may be automatically established according to the parameter value of the parameter option. For example, if the parameter value of the connection manner parameter options is set as PPPOE, a PPPOE network connection may be automatically established when the router is initiated. After the parameter value of the connection manner parameter option is set as PPPOE, the parameter values corresponding to parameter options of PPPOE account and PPPOE password may be acquired for PPPOE login, while the account and the password carried in the response message are respectively set as parameter values corresponding to parameter options of PPPOE account and PPPOE password.

Parameters for DHCP Network Connection Manner

If the network connection manner to be used is a DHCP network connection manner, the parameter value of the connection manner parameter options among connection manner parameters is set as DHCP.

For example, a user interface for setting network connection parameters may be included in a settings page of the router. Accordingly, the connection manner parameter options, which may include a plurality of optional parameter values such as PPPOE, DHCP and so on, may be included in the settings page. Different parameter options correspond to different network connection manners. Upon initiating the router, a network connection of a corresponding network connection manner may be automatically established according to the parameter value of the parameter option. For example, if the parameter value of the connection manner parameter option is set as DHCP, a DHCP network connection may be automatically established when the router is initiated.

Accordingly, the parameter value of connection manner parameter options may be automatically set by the router, and thus the router may establish network connection according to a corresponding parameter value. Therefore, it is not required that a user clicks on options in a settings page of the router step by step so as to accomplish the settings, so that the efficiency of setting network connection parameters may be effectively improved.

In this embodiment of the present disclosure, network connection manners supported by the current access network is acquired, a network connection manner to be used is selected from the network connection manners supported by the current access network, and network connection parameters are automatically set for the selected network connection manner. In this way, the network connection parameters may be set according to the network connection manners supported by the current access network without clicking on multi-level options in a settings page, thereby improving efficiency of setting network connection parameters.

Figure 3:
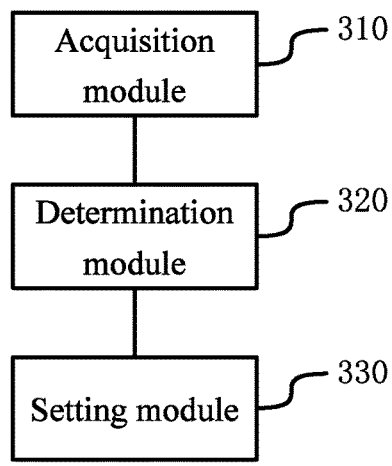
FIG. 3 is a block diagram showing an apparatus for setting network connection parameters according to an exemplary embodiment of the present disclosure.

Based on the same technical concept, the embodiment of the present disclosure provides an apparatus for setting network connection parameters, which includes the following modules, as shown in FIG. 3.

An acquisition module 310 is configured to acquire all network connection manners supported by the current access network.

A determination module 320 is configured to select a network connection manner to be used from the acquired network connection manners.

A setting module 330 is configured to automatically set network connection parameters for the selected the network connection manner.

Moreover, the acquisition module 310 can be further configured to: broadcast a discovery message corresponding to a network connection manner preset in the network; receiving a response message for the broadcast discovery message; and determine a network connection manner corresponding to the received response message as a network connection manner supported by the network Furthermore, the acquisition module 310 is further configured to: respectively broadcast the discovery message corresponding to a Point-to-Point Protocol over Ethernet (PPPOE) network connection manner and a Dynamic Host Configuration Protocol (DHCP) network connection manner in the network.

Alternatively, the acquisition module 310 can be further configured to: broadcast a first discovery message corresponding to a first network connection manner in the network; determine the first network connection manner as a network connection manner supported by the network if a response message corresponding to the first network connection manner is received; broadcast a second discovery message corresponding to a second network connection manner in the network if a response message corresponding to the first network connection manner is not received; and determine the second network connection manner as the network connection manner supported by the current access network when a response message corresponding to the second network connection manner is received.

Moreover, the acquisition module 310 can be further configured to acquire network connection manners supported by the current access network when data on a settings page is transmitted to a terminal device requesting for displaying the settings page.

In addition, the determination 320 is further configured to: transmit a network selection request to a terminal device requesting for displaying profile settings page, wherein the network selection request carries the network connection manners supported by the network; receive a response message carrying the selected network connection manner from the terminal device; and determine the selected network connection manner carried by the response message as the network connection manner to be used.

In this case, the acquired network connection manner can be determined as the network connection manner to be used, if there is only one acquired network connection manner supported by the current access network.

Alternatively, the determination 320 is further configured to determine a default network connection manner as the network connection manner to be used if there is no network connection manner supported by the current access network.

Furthermore, the setting module 330 is configured to: acquire an account number and a password for Point-to-Point Protocol over Ethernet (PPPOE) login if the network connection manner to be used is a PPPOE network connection manner; set the connection manner parameter of the network connection parameters as PPPOE; and set a PPPOE account number parameter and a PPPOE password parameter as the acquired account number and password, respectively.

Alternatively, the setting module 330 is configured to set a connection manner parameter of the network connection parameters as DHCP if the network connection manner to be used is a DHCP network connection manner.

In this embodiment of the present disclosure, all network connection manners supported by the current access network are acquired, a network connection manner to be used is selected from the network connection manners supported by the current access network, and network connection parameters are set for the selected network connection manner. In this way, the network connection parameters may be set according to the network connection manners supported by the current access network without clicking on multi-level options in a settings page, thereby improving efficiency of setting network connection parameters.

Figure 4:
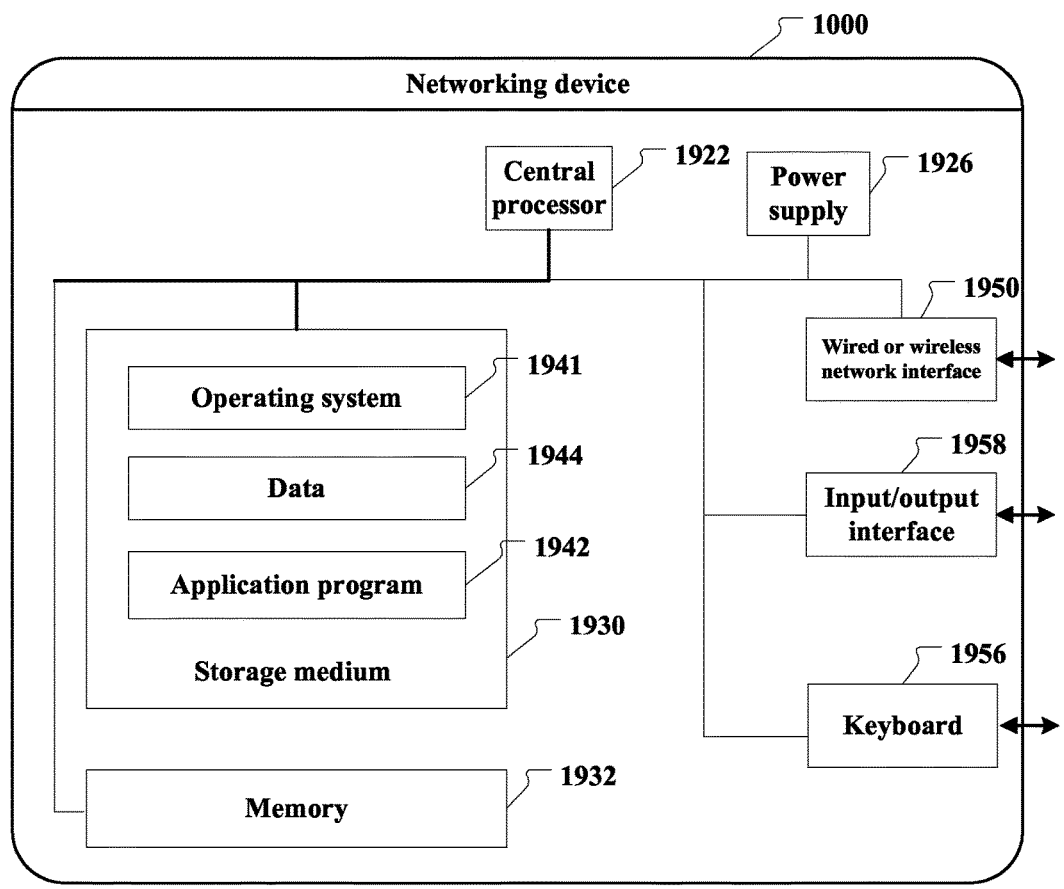
FIG. 4 is a block diagram showing a networking device according to an exemplary embodiment of the present disclosure.

FIG. 4 is a block diagram of a networking device according to the embodiment of the present disclosure. The networking device 100 may include one or more central processing units (CPU) 1922 (e.g., one or more processors) and memory 1932, and one or more storage medium 1930 (e.g., one or more huge storage device) storing application program 1942 or data 1944. Herein, the memory 1932 and the storage medium 1930 may be a temporally storage medium or a permanently storage medium. The programs stored in the storage medium 1930 may include one or more modules (not shown in drawings), each of which may include a series of instructions with respect of the networking device. Further, the central processing units 1922 may be configured to communicate with the storage medium 1930. The series of instructions stored in the storage medium 1930 may be executed in the networking device 1900.

The networking device 1000 may further include one or more power supplies 1926, one or more wired or wireless network interfaces 1950, and one or more input/output interfaces 1958. Furthermore, the networking device 1000 may further include one or more keyboards 1956, and/or one or more operating systems 1941, such as Windows Server™, Mac OS X™, Unix™, Linux™, FreeBSD™ and so on.

The networking device 1000 may be such as a router, which may include a memory and one or more programs, wherein the one or more programs are stored in the memory and the one or more programs are configured to be executed by one or more processors and include the following operable instructions of: accessing a network; acquiring all network connection manners supported by the network; selecting a network connection manner to be used from the acquired network connection manners; and automatically setting network connection parameters for the selected network connection manner.

In addition, the above steps of the method may also be implemented with a controller and a computer-readable storage device which stores computer programs that cause the controller to realize the above steps and functions of the units.

In addition, it should be appreciated that the above mentioned computer-readable storage device may be a volatile memory or a nonvolatile memory, or may include the both. For example, but without limitation, the nonvolatile memory may include a read only memory (ROM), a programmable ROM (PROM), an electrically programmable ROM (EPROM), an electrically erasable programmable ROM (EEPROM), or a flash memory. The volatile memory may include a random access memory (RAM) which may serve as an external cache RAM memory. As an example, but without limitation, the RAM may of various forms, such as a synchronous RAM (DRAM), a dynamic RAM (DRAM), a synchronous DRAM (SDRAM), a double data rate SDRAM (DDR SDRAM), an enhanced SDRAM (ES-DRAM), a synchronous link DRAM (SLDRAM) and a direct Rambus RAM (DRRAM). The storage device according to the disclosed aspects is intended to include but not limited to these and other suitable types of memories.

It should be appreciated by those skilled in the art that, various exemplary logical blocks, modules, circuits, and algorithm steps described in the present disclosure may be implemented as electronic hardware, computer software or combination of both. In order to clearly illustrate the interchangeability between the hardware and the software, a general description has been given to various illustrative components, blocks, modules, circuits and functions of steps. It depends on the particular application and the restriction from the design of the whole system that such functions will be implemented as software or hardware. Those functions may be realized in various means for each of the particular application by those skilled in the art without departing the scope of the present disclosure.

Various illustrative logical blocks, modules and circuits described in the present disclosure may be implemented or performed by the following components that are designed to perform the above functions: a general purpose processor, a digital signal processor (DSP), a dedicated integrated circuit (ASIC), a field programmable gate array (FPGA) or other programmable logic device, discrete gates or transistor logics, discrete hardware components or any combination of these components. The general purpose processor may be a microprocessor. Alternatively, the processor may be any one of a conventional processor, a controller, a microcontroller, or a state machine. The processor may be implemented as combination of computing devices, such as combination of a DSP and a microprocessor, a plurality of microprocessors, one or more microprocessors in conjunction with a DSP core, or any other such configuration.

The method and steps of the algorithm described in the present disclosure may be directly contained in hardware, in a software module executed by a processor or in combination of the both. The software may reside in a RAM memory, a flash memory, a ROM memory, an EPROM memory, an EEPROM memory, a registers, a hard disk, a removable disk, a CD-ROM, or any other storage medium known in the art. An exemplary storage medium is coupled to the processor such the processor can read information from the storage medium or write information thereto. In an alternative embodiment, the storage medium maybe integrated with the processor. The processor and the storage medium may reside in an ASIC which may reside in a user terminal device. In an alternative embodiment, the processor and the storage medium may reside in a user terminal device as discrete components.

In one or more exemplary designs, the above functions may be implemented in hardware, software, firmware, or any combination thereof. If implemented in software, the above functions may be stored in a computer readable medium as one or more instructions or codes, or transmitted through the computer readable medium. The computer readable medium includes computer storage medium and communication medium. The communication media includes any medium that may be used to transmit computer programs from one location to another location. The storage medium may be any available medium that is accessible by a general or special computer. For example, but without limitation, the computer readable medium may include a RAM, a ROM, an EEPROM, a CD-ROM or other CD storage devices, disk storage device or other magnetic storage devices, or any other medium that may be used to carry or store the required program codes in a form of instructions or data structure and may be accessible by a general or special computer or a general or special processor. In addition, any connection may be appropriately called a computer-readable medium. For example, if a coaxial cable, a fiber optic cable, a twisted pair, a digital subscriber line (DSL) or wireless technologies such as infrared rays, radio and microwave are used to transmit software from a website, a server or other remote source, the above coaxial cable, the fiber optic cable, the twisted pair, the DSL or wireless technologies such as infrared rays, radio and microwave are all within the definition of the medium. As used herein, the disk and the optical disk includes a compression disk (CD), a laser disc, an optical disk, a digital versatile disc (DVD), a floppy disks, a blue-ray disk, among which the magnetic disk normally represents data magnetically, and the optical disk represents data optically by utilizing a laser. The combination of the above should also be included in the scope of the computer readable medium.

The present disclosure also provides a non-transitory computer-readable storage medium having stored therein instructions that, when executed by a processor of a networking device, causes the networking device to perform a method for setting network connection parameters, the method including: accessing a network; acquiring all network connection manners supported by the network; selecting a network connection manner to be used from the acquired network connection manners; and automatically setting network connection parameters for the selected network connection manner.

Although the exemplary embodiments of the present disclosure has been illustrated in the above, it should be noted that, various alteration and modification may be made without departing the scope of the present disclosure which is defined by the claims. The functions, steps and/or operations of the method claims according to the described embodiments of the present disclosure, may not necessarily be performed in a particular order. In addition, although elements of the present disclosure may be described or prescribed in a single form, multiple forms may also be devised, unless the single form is explicitly prescribed.

The objects, technical solutions and advantageous effects of the present disclosure have been explained in a further detail with the above specific embodiments. It should be appreciated that, the above are merely specific embodiments of the present disclosure, and not used to limit the scope of the present disclosure. Any alteration, equivalent replacement, modification and the like within the spirit and principle of the present disclosure should be embraced in the protection scope of the present disclosure.

What is claimed is:

1. A method for automatically setting network connection parameters in a networking device, comprising:
   acquiring network connection manners supported by a current access network when transmitting data on a setting page to a terminal device requesting for displaying the setting page;
   transmitting a network selection request to the terminal device requesting for displaying the setting page, wherein the network selection request carries the network connection manners supported by the network;
   receiving a response message carrying the selected network connection manner from the terminal device;
   determining the selected network connection manner carried by the response message as the network connection manner to be used; and
   automatically setting network connection parameters for the selected network connection manner.

2. The method according to claim 1, wherein acquiring network connection manners supported by the current access network comprises:
   broadcasting a discovery message corresponding to the network connection manner preset in the network;
   receiving a response message for the broadcast discovery message; and
   determining the network connection manner corresponding to the received response message as the network connection manner supported by the network.

3. The method according to claim 2, wherein broadcasting the discovery messages comprises:
   respectively broadcasting the discovery message corresponding to a Point-to-Point Protocol over Ethernet (PPPOE) network connection manner and a Dynamic Host Configuration Protocol (DHCP) network connection manner in the network.

4. The method according to claim 1, wherein acquiring network connection manners supported by the current access network comprises:
   broadcasting a first discovery message corresponding to a first network connection manner in the network;
   determining the first network connection manner as a network connection manner supported by the network if a response message corresponding to the first network connection manner is received.

5. The method according to claim 4, wherein acquiring network connection manners supported by the current access network further comprises:
   broadcasting a second discovery message corresponding to a second network connection manner in the network if a response message corresponding to the first network connection manner is not received; and
   determining the second network connection manner as the network connection manner supported by the current access network when a response message corresponding to the second network connection manner is received.

6. The method according to claim 1, wherein the network connection manner supported by the current access network is acquired after receiving a request for displaying a profile settings page from a terminal device.

7. The method according to claim 1, wherein the acquired network connection manner is determined as the network connection manner to be used if there is only one acquired network connection manner supported by the network.

8. The method according to claim 1, wherein a default network connection manner is determined as the network connection manner to be used if there is no network connection manner supported by the current access network.

9. The method according to claim 1, wherein automatically setting network connection parameters comprises:
   acquiring an account number and a password for Point-to-Point Protocol over Ethernet (PPPOE) login if the network connection manner to be used is a PPPOE network connection manner;
   setting the connection manner parameter of the network connection parameters as PPPOE; and
   setting a PPPOE account number parameter and a PPPOE password parameter as the acquired account number and password, respectively.

10. The method according to claim 1, wherein automatically setting network connection parameters comprises:
    setting a connection manner parameter of the network connection parameters as DHCP if the network connection manner to be used is a DHCP network connection manner.

11. A networking device, comprising:
    a memory; and
    one or more processors;
    wherein one or more programs are stored in the memory and the one or more programs are configured to be executed by the one or more processors and comprise the following operable instructions of:
    acquiring network connection manners supported by a current access network when transmitting data on a setting to a terminal device requesting for displaying the setting page;
    transmitting a network selection request to the terminal device requesting for displaying the setting page, wherein the network selection request carries the network connection manners supported by the network;
    receiving a response message carrying the selected network connection manner from the terminal device;
    determining the selected network connection manner carried by the response message as the network connection manner to be used; and
    automatically setting network connection parameters for the selected network connection manner.

12. The networking device according to 11, wherein acquiring network connection manners supported by the current access network comprises:
    broadcasting a discovery message corresponding to the network connection manner preset in the network;
    receiving a response message for the broadcast discovery message; and
    determining the network connection manner corresponding to the received response message as the network connection manner supported by the network.

13. The networking device according to 11, wherein acquiring network connection manners supported by the current access network comprises:
    broadcasting a first discovery message corresponding to a first network connection manner in the network;
    determining the first network connection manner as a network connection manner supported by the network if a response message corresponding to the first network connection manner is received.

14. The networking device according to 11, wherein the network connection manner supported by the current access network is acquired after receiving a request for displaying a profile settings page from a terminal device.

15. The networking device according to 11, wherein the acquired network connection manner is determined as the network connection manner to be used if there is only one acquired network connection manner supported by the network.

16. The networking device according to 11, wherein a default network connection manner is determined as the network connection manner to be used if there is no network connection manner supported by the current access network.

17. The networking device according to 11, wherein automatically setting network connection parameters comprises:

acquiring an account number and a password for Point-to-Point Protocol over Ethernet (PPPOE) login if the network connection manner to be used is a PPPOE network connection manner;

setting the connection manner parameter of the network connection parameters as PPPOE; and setting a PPPOE account number parameter and a PPPOE password parameter as the acquired account number and password, respectively.

18. A non-transitory computer-readable storage medium having stored therein instructions that, when executed by a processor of a networking device, causes the networking device to perform a method for automatically setting network connection parameters, the method comprising:

acquiring network connection manners supported by a current access network when transmitting data on a setting page to a terminal device requesting for displaying the setting page;

transmitting a network selection request to the terminal device requesting for displaying the setting page, wherein the network selection request carries the network connection manners supported by the network;

receiving a response message carrying the selected network connection manner from the terminal device;

determining the selected network connection manner carried by the response message as the network connection manner to be used; and automatically setting network connection parameters for the selected network connection manner.

* * * * *